(12) United States Patent
Yamaguchi et al.

(10) Patent No.: US 11,664,706 B2
(45) Date of Patent: May 30, 2023

(54) ROTARY ELECTRIC MACHINE UNIT

(71) Applicant: HONDA MOTOR CO., LTD., Tokyo (JP)

(72) Inventors: Tadashi Yamaguchi, Saitama (JP); Akio Tsumasaka, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 87 days.

(21) Appl. No.: 17/119,340

(22) Filed: Dec. 11, 2020

(65) Prior Publication Data

US 2021/0194327 A1 Jun. 24, 2021

(30) Foreign Application Priority Data

Dec. 18, 2019 (JP) .............................. JP2019-228479

(51) Int. Cl.
*H02K 9/19* (2006.01)
*H02K 9/193* (2006.01)
*H02K 11/21* (2016.01)

(52) U.S. Cl.
CPC ............... *H02K 9/193* (2013.01); *H02K 9/19* (2013.01); *H02K 11/21* (2016.01)

(58) Field of Classification Search
CPC .......... H02K 9/19; H02K 9/193; H02K 11/21; H02K 11/225; H02K 9/005; H02K 9/00; H02K 9/197; H02K 11/00; H02K 11/22; H02K 5/00; H02K 5/22; H02K 5/225; H02K 7/00; H02K 7/006; H02K 7/10; H02K 7/108

USPC .................................................. 310/54, 68 B
See application file for complete search history.

(56) References Cited

U.S. PATENT DOCUMENTS

2019/0305644 A1* 10/2019 Ideue ..................... H02K 7/108

FOREIGN PATENT DOCUMENTS

| JP | H1118361 | * | 1/1999 | ............... H02K 5/22 |
| JP | 2006005984 | * | 1/2006 | ............... H02K 9/19 |
| JP | 2006-115650 A | | 4/2006 | |

* cited by examiner

*Primary Examiner* — Tran N Nguyen
(74) *Attorney, Agent, or Firm* — Paratus Law Group, PLLC

(57) ABSTRACT

A rotary electric machine unit includes a rotary electric machine, where a protruding portion extending in an axial direction from a one end side cover portion toward the rotary electric machine is formed at a position below a rotation axis of the rotary electric machine and overlapping with the rotary electric machine. A refrigerant flow lower surface formed on a tip end side of the protruding portion and extending in the axial direction, and a recessed surface adjacent to a base side end portion of the refrigerant flow lower surface and extending in the axial direction at a position recessed upward than the refrigerant flow lower surface are formed below a center of the protruding portion in the upper-lower direction. The refrigerant flow lower surface of the protruding portion is arranged such that an axial central portion overlaps the rotary electric machine in the axial direction.

3 Claims, 3 Drawing Sheets

ROTARY ELECTRIC MACHINE UNIT

CROSS-REFERENCE TO RELATED APPLICATIONS

The present application claims the benefit of priority of Japanese Patent Application No. 2019-228479, filed on Dec. 18, 2019, the content of which is incorporated herein by reference.

TECHNICAL FIELD

The present invention relates to a rotary electric machine unit mounted on an electric vehicle or the like.

BACKGROUND ART

In the related art, a rotary electric machine unit is mounted on an electric vehicle or the like. When a rotary electric machine such as a motor or a generator generates heat due to driving, the output efficiency decreases. Therefore, it is necessary to cool the rotary electric machine appropriately. For example, JP-A-2006-115650 discloses a rotary electric machine unit in which a cooling oil pipe is provided to be arranged above a rotary electric machine, and cooling oil drops from the cooling oil pipe onto the rotary electric machine, so that the rotary electric machine is cooled.

However, in the rotary electric machine unit according to the JP-A-2006-115650, when viewed from an axial direction, above a rotation axis, most of refrigerant dropped from the cooling oil pipe flows along a coil end portion that protrudes outward in the axial direction from a stator core, while below the rotation axis, the refrigerant flows, not along the coil end portion, but down directly below due to the gravity. Therefore, it is difficult to supply the refrigerant to a portion below the rotation axis of the rotary electric machine.

SUMMARY

The present invention provides a rotary electric machine unit in which a larger amount of refrigerant can be supplied to a portion of a rotary electric machine below a rotation axis.

According to an aspect of the present invention, there is provided a rotary electric machine unit, including: a rotary electric machine having a rotation axis extending in a horizontal direction; a rotary electric machine housing having a rotary electric machine accommodating portion in which the rotary electric machine is accommodated; and a refrigerant supply portion accommodated in the rotary electric machine accommodating portion and through which a refrigerant is supplied to the rotary electric machine, where: the refrigerant supply portion is arranged at a position above the rotation axis of the rotary electric machine and overlapping the rotary electric machine in a left-right direction which is orthogonal to both an upper-lower direction and an axial direction; the refrigerant is discharged from the refrigerant supply portion so that the refrigerant is supplied to the rotary electric machine; the rotary electric machine housing has a one end side cover portion facing one end surface in the axial direction of the rotary electric machine; a protruding portion extending in the axial direction from the one end side cover portion toward the rotary electric machine is formed at a position below the rotation axis of the rotary electric machine and overlapping with the rotary electric machine in the left-right direction; below a center of the protruding portion in the upper-lower direction, a refrigerant flow lower surface formed on a tip end side of the protruding portion and extending in the axial direction, and a recessed surface adjacent to a base side end portion of the refrigerant flow lower surface and extending in the axial direction at a position recessed upward than the refrigerant flow lower surface are formed as viewed from the left-right direction; and the refrigerant flow lower surface of the protruding portion is arranged such that an axial central portion overlaps the rotary electric machine in the axial direction.

According to the aspect of the present invention, the refrigerant flowing downward from the axial central portion of the refrigerant flow lower surface is supplied to the rotary electric machine, so that a larger amount of refrigerant can be supplied to a portion of the rotary electric machine below the rotation axis.

DESCRIPTION OF EMBODIMENTS

An embodiment of a rotary electric machine unit according to the present invention will be described below with reference to the accompanying drawings.

Figure 1:
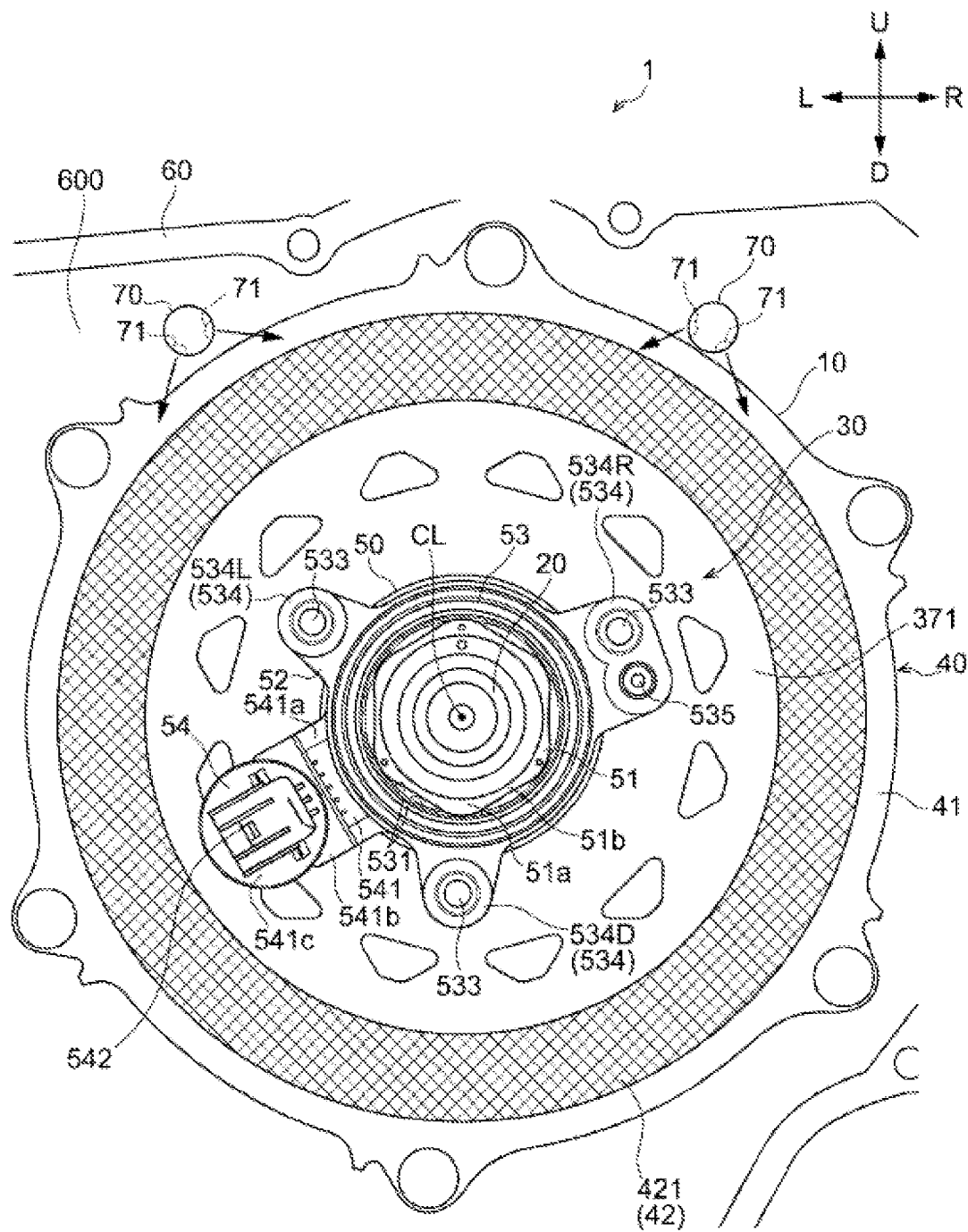
FIG. 1 is a view of a rotary electric machine unit according to an embodiment of the present invention as viewed from a front side.
Figure 2:
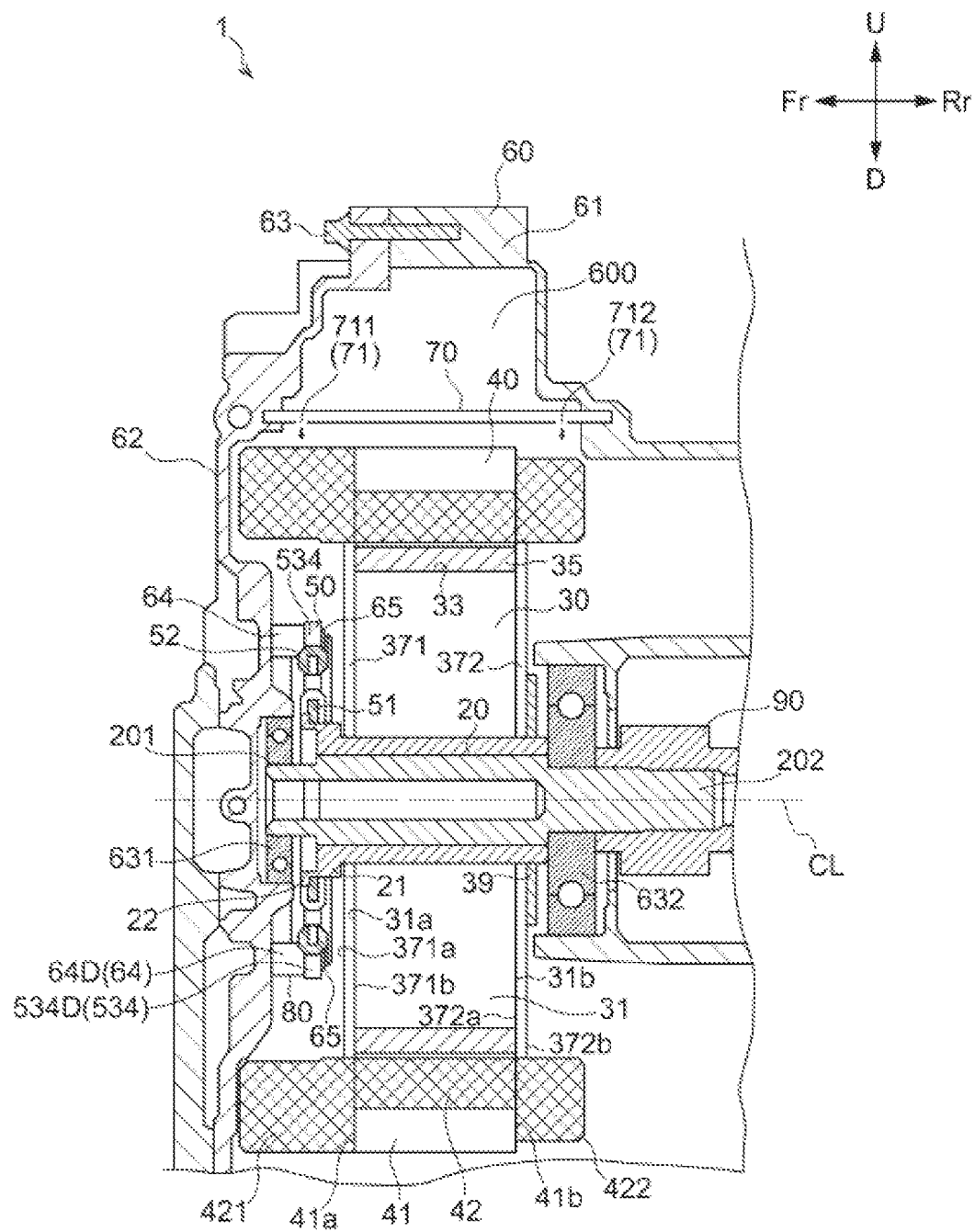
FIG. 2 is a sectional view of a main part of the rotary electric machine unit according to the embodiment of the present invention as viewed from a right side.

As shown in FIGS. 1 and 2, the rotary electric machine unit 1 according to the present embodiment includes a rotary electric machine 10 having a rotation axis CL extending in a horizontal direction, a resolver 50, and a rotary electric machine housing 60 having a rotary electric machine accommodating portion 600 in which the rotary electric machine 10 and the resolver 50 are accommodated.

In the present specification and the like, the axial direction, a radial direction, and a circumferential direction refer to directions based on the rotation axis CL of the rotary electric machine 10. Further, in the present specification or the like, in order to simplify and clarify the description, the axial direction is defined as a front-rear direction, and a direction orthogonal to both an upper-lower direction and the front-rear direction (axial direction) is defined as a left-right direction, which are independent from a front-rear direction or the like of a product on which the rotary electric machine unit 1 is mounted. That is, for example, when the rotary electric machine unit 1 is mounted on a vehicle, the axial direction of the rotary electric machine 10 may coincide with a front-rear direction of the vehicle, may be a left-right direction of the vehicle, or may be a horizontal direction inclined from the front-rear direction and the left-right direction of the vehicle. In the drawings, a front side of the rotary electric machine unit 1 is denoted by Fr, a rear side thereof is denoted by L, a left side thereof is denoted by L, a right side thereof is denoted by R, an upper side thereof is denoted by U, and a lower side thereof is denoted by D.

<Rotary Electric Machine>

The rotary electric machine 10 includes a rotation shaft 20, a rotor 30 having a substantially annular shape and fixed to an outer peripheral surface of the rotation shaft 20, and a stator 40 arranged so as to face an outer peripheral surface of the rotor 30.

The rotation shaft 20 is an input-output shaft of the rotary electric machine 10, and extends horizontally in the front-rear direction. A front end portion 201 of the rotation shaft 20 is housed in the rotary electric machine accommodating portion 600 of the rotary electric machine housing 60. A rear end portion 202 of the rotation shaft 20 protrudes to the rear side of the rotary electric machine accommodating portion 600, and is coaxially connected with a transmission shaft 90 arranged outside the rotary electric machine accommodating portion 600.

A flange 21 and a resolver rotor fixing portion 22 that have a substantially annular shape and expand in the radial direction are provided on an outer circumference of the rotation shaft 20. The resolver rotor fixing portion 22 is provided so as to protrude outward in the radial direction from a front end surface of the flange 21.

The rotor 30 includes a rotor core 31 having a substantially annular shape and a plurality of magnet insertion holes 33 parallel to the rotation axis CL and provided along the circumferential direction on an outer peripheral side, permanent magnets 35 inserted into the magnet insertion holes 33 respectively, a front end side end surface plate 371 and a rear end side end surface plate 372 arranged on both end surfaces of the rotor core 31 in the axial direction, and a collar 39.

Both the front end side end surface plate 371 and the rear end side end surface plate 372 have a substantially annular shape that is substantially the same as the rotor core 31 in the radial direction. A front side surface 371a of the front end side end surface plate 371 is in contact with the flange 21 of the rotation shaft 20, and a rear side surface 371b of the front end side end surface plate 371 is in contact with a front end surface 31a of the rotor core 31. The permanent magnet 35 inserted into the magnet insertion hole 33 of the rotor core 31 is regulated by the front end side end surface plate 371 so as not to protrude to the front side of the rotor core 31. A front side surface 372a of the rear end side end surface plate 372 is in contact with a rear end surface 31b of the rotor core 31. The permanent magnet 35 inserted into the magnet insertion hole 33 of the rotor core 31 is regulated by the rear end side end surface plate 372 so as not to protrude to the rear side of the rotor core 31.

The collar 39 is in contact with a rear side surface 372b of the rear end side end surface plate 372 and is fixed to the outer peripheral surface of the rotation shaft 20. Further, the collar 39 presses the front end side end surface plate 371, the rotor core 31, and the rear end side end surface plate 372 to the front side. As a result, the rotor 30 is sandwiched between the flange 21 of the rotation shaft 20 and the collar 39, and is fixed to the rotation shaft 20 in the axial direction.

The stator 40 includes a stator core 41 having a substantially annular shape and a plurality of tooth portions (not shown) provided in an annular shape on an inner peripheral surface, and a coil 42 configured by a plurality of U-phase, V-phase, and W-phase windings wound around the tooth portion. The coil 42 is inserted between adjacent tooth portions of the stator core 41, and includes a front coil end portion 421 protruding forward from a front end surface 41a of the stator core 41, and a rear coil end portion 422 protruding rearward from a rear end surface 41b of the stator core 41.

<Resolver>

The resolver 50 includes a resolver rotor 51 attached to the rotation shaft 20 and a resolver stator 52 attached to the rotary electric machine housing 60. In the present embodiment, the resolver 50 is provided in front of the rotor 30 and the stator 40 of the rotary electric machine 10.

The second resolver rotor 51 is formed of, for example, a tubular member made of electromagnetic steel (electromagnetic steel pipe). The electromagnetic steel pipe is a steel pipe excellent in magnetic characteristics. The resolver rotor 51 is formed with a thick portion 51a whose length in the radial direction is long and a thin portion 51b whose length in the radial direction is short. The resolver rotor 51 is fixed to the resolver rotor fixing portion 22 of the rotation shaft 20 by, for example, press fitting.

The resolver stator 52 is arranged to face outward in the radial direction of the resolver rotor 51, and includes a stator portion 53 having a substantially annular shape centered on the rotation axis CL, and a telecom connector portion 54 extending radially outward from the stator portion 53 and protruding forward in the axial direction. In the present embodiment, the telecom connector portion 54 extends from the stator portion 53 in a lower left direction.

An inner peripheral surface of the stator portion 53 is provided with a plurality of detection portions 531 formed so as to extend inward in the radial direction and arranged in an annular shape in the circumferential direction. In the present embodiment, 14 detection portions 531 are arranged in an annular shape in the circumferential direction along the inner peripheral surface of the stator portion 53. A coil (not shown) is arranged in each of the detection portions 531 inside the stator portion 53.

A plurality of fastening portions 534 are formed on an outer peripheral surface of the stator portion 53 so as to extend outward in the radial direction with bolt insertion holes 533 penetrating in the central axial direction formed thereon. In the present embodiment, a total of three fastening portions 534 are formed, including a lower fastening portion 534D extending outward in the radial direction toward the lower side from the outer peripheral surface of the stator portion 53, an upper left fastening portion 534L extending outward in the radial direction toward the upper left, and an upper right fastening portion 534R extending outward in the radial direction toward the upper right. The lower fastening portion 534D is provided at a position below the rotation axis CL and overlapping with the rotary electric machine 10 in the left-right direction.

On the outer peripheral surface of the stator portion 53, a knock portion 535 that is formed to extend outward in the radial direction and protrude forward is provided. In the present embodiment, the knock portion 535 has a pin shape protruding forward. Further, in the present embodiment, the knock portion 535 is integrally formed with the upper right fastening portion 534R.

The telecom connector portion 54 includes an extension portion 541 extending outward in the radial direction from the outer peripheral surface of the stator portion 53 to the lower left, and an external connection portion 542 protruding forward from the extension portion 541. The telecom connector portion 54 is formed integrally with the stator portion 53.

The extension portion 541 of the telecom connector portion 54 includes a first extension portion 541a extending outward in the radial direction from the outer peripheral surface of the stator portion 53 toward the lower left, and a second extension portion 541b which extends forward in the axial direction from a radial outer end portion of the first extension portion 541a and has a substantially disk-shaped fitting portion 541c formed on a front surface thereof.

The external connection portion 542 of the telecom connector portion 54 is formed so as to protrude forward from a front surface of the fitting portion 541c of the second extension portion 541b. The external connection portion 542 protrudes to the outside of the rotary electric machine housing 60, and a wire harness or the like extending from a control unit or the like outside the rotary electric machine unit 1 is connected to the external connection portion 542, so that electric power is supplied from the outside of the rotary electric machine unit 1 to the coil arranged inside the stator portion 53 via a terminal portion.

For example, when a current is supplied to the coil 42 of the stator 40 of the rotary electric machine 10, the rotor 30 rotates, and the rotation shaft 20 and the resolver rotor 51 rotate in accordance with the rotation of the rotor 30.

When the resolver rotor 51 rotates, a gap between the resolver rotor 51 and the resolver stator 52 is changed by the thick portion 51a and the thin portion 51b of the resolver rotor 51. When a current is supplied to the coil of the resolver stator 52, a magnetic field is formed, and an amount of magnetic fluxes changes from place to place as the gap between the resolver rotor 51 and the resolver stator 52 changes in accordance with the rotation of the resolver rotor 51. Rotation speeds of the rotation shaft 20 and the rotor 30, that is, the rotation speed of the rotary electric machine 10 can be detected by detecting a change in the magnetic flux by the detection portion 531 of the resolver stator 52.

<Rotary Electric Machine Housing>

The rotary electric machine housing 60 has a main housing 61 and a front cover 62. The main housing 61 covers an outer peripheral surface and a rear surface of the rotary electric machine 10, forms an outer peripheral surface and a rear surface of the rotary electric machine accommodating portion 600, and has an open front surface. The front cover 62 faces a front surface of the rotary electric machine 10, covers the front surface of the rotary electric machine 10, forms a front surface of the rotary electric machine accommodating portion 600, and closes the open front surface of the main housing 61. The front cover 62 is fixed to the main housing 61 by a fastening bolt 63.

The front cover 62 is provided with a first bearing 631. The first bearing 631 pivotally supports a front end of the rotation shaft 20.

The front cover 62 is provided with a fitting hole (not show) that penetrates in the front-rear direction and fits the fitting portion 541c of the resolver stator 52 at a position facing the front of the fitting portion 541c of the resolver stator 52. The front cover 62 is provided with a knock accommodating portion having a substantially cylindrical shape protruding rearward from the front cover 62 and into which the knock portion 535 can be inserted, at a position facing the front of the knock portion 535 of the resolver stator 52. The knock portion 535 of the resolver stator 52 is inserted into the knock accommodating portion and the fitting portion 541c of the resolver stator 52 is fitted into the fitting hole, so that the resolver stator 52 is positioned with respect to the front cover 62.

The front cover 62 is provided with a fastening boss portion 64 which is provided to face the front of the fastening portion 534 of the resolver stator 52, has a substantially cylindrical shape protruding rearward from the front cover 62, and has a thread groove formed on an inner peripheral surface thereof. Therefore, a lower fastening boss portion 64D provided at a position facing the front of the lower fastening portion 534D of the resolver stator 52 is provided at a position below the rotation axis CL and overlapping with the rotary electric machine 10 in the left-right direction.

The fastening bolt 65 is inserted into the bolt insertion hole 533 provided in the fastening portion 534 of the resolver stator 52 and fastened to the fastening boss portion 64 provided in the front cover 62, so that the resolver stator 52 is attached to and fixed to the front cover 62.

A second bearing 632 is provided on the rear surface of the rotary electric machine accommodating portion 600 of the main housing 61. The second bearing 632 pivotally supports a front end portion of the rotation shaft 20.

As described above, the rotation shaft 20 of the rotary electric machine 10 is rotatably supported by the first bearing 631 and the second bearing 632 of the rotary electric machine housing 60. Therefore, the rotor 30 of the rotary electric machine 10 and the resolver rotor 51 of the resolver 50 which are fixed to the rotation shaft 20 are also accommodated in the rotary electric machine housing 60 in a state of being rotatable together with the rotation shaft 20.

<Refrigerant Supply Pipe>

The rotary electric machine accommodating portion 600 is provided with a refrigerant supply pipe 70 for supplying the refrigerant to the rotary electric machine 10. A pair of refrigerant supply pipes 70 are provided on a left side and a right side of the rotation axis CL of the rotary electric machine 10 when viewed from the axial direction at positions upper than the rotation axis CL of the rotary electric machine 10 and overlapping with the rotary electric machine 10 in the left-right direction. Each of the pair of refrigerant supply pipes 70 extends in parallel with the rotation axis CL from the front surface to the rear surface of the rotary electric machine accommodating portion 600.

Refrigerant discharge holes 71 are provided in the pair of refrigerant supply pipes 70 at positions overlapping with the rotary electric machine 10 in the axial direction. Refrigerant such as an automatic transmission fluid (ATF) is supplied to the pair of refrigerant supply pipes 70 from a refrigerant supply device (not shown). The refrigerant supplied from the refrigerant supply device to the refrigerant supply pipe 70 is discharged (including dropping and jetting) from the refrigerant discharge holes 71 and supplied to the rotary electric machine 10 to cool the rotary electric machine 10.

In the present embodiment, the refrigerant discharge holes 71 include a front refrigerant discharge hole 711 provided at a position overlapping the front coil end portion 421 of the rotary electric machine 10 in the axial direction, and a rear refrigerant discharge hole 712 provided at a position overlapping the rear coil end portion 422 of the rotary electric machine 10 in the axial direction. The refrigerant supplied to the refrigerant supply pipe 70 and discharged from the front refrigerant discharge hole 711 is supplied to the front coil end portion 421 of the rotary electric machine 10 to cool the front coil end portion 421. The refrigerant supplied to the refrigerant supply pipe 70 and discharged from the rear refrigerant discharge hole 712 is supplied to the rear coil end portion 422 of the rotary electric machine 10 to cool the rear coil end portion 422.

Most of the refrigerant discharged from the refrigerant discharge hole 71 flows outward in the left-right direction along the front coil end portion 421 and the rear coil end portion 422. Then, the refrigerant that has reached a left end portion and a right end portion positioned at the central portion in the upper-lower direction of the front coil end portion 421 and the rear coil end portion 422 separates from the front coil end portion 421 and the rear coil end portion 422, and flows down directly below due to gravity. Therefore, most of the refrigerant discharged from the refrigerant discharge holes 71 and flowing outward in the left-right direction along the front coil end portion 421 and the rear coil end portion 422 is not supplied to the front coil end portion 421 and the rear coil end portion 422 below the rotation axis CL.

On the other hand, a part of the refrigerant discharged from the refrigerant discharge hole 71 passes through the front coil end portion 421 and the rear coil end portion 422, and flows to the rotation shaft 20, a front end surface of the rotor 30, and the resolver rotor 51. The refrigerant flowed to the rotation shaft 20, the front end surface of the rotor 30, and the resolver rotor 51 is scattered inside the rotary electric machine accommodating portion 600 of the rotary electric machine housing 60 due to the rotation of the rotation shaft 20, the rotor 30, and the resolver rotor 51, and flows downward through the front cover 62 and the resolver stator 52.

<Protruding Portion>

Figure 3:
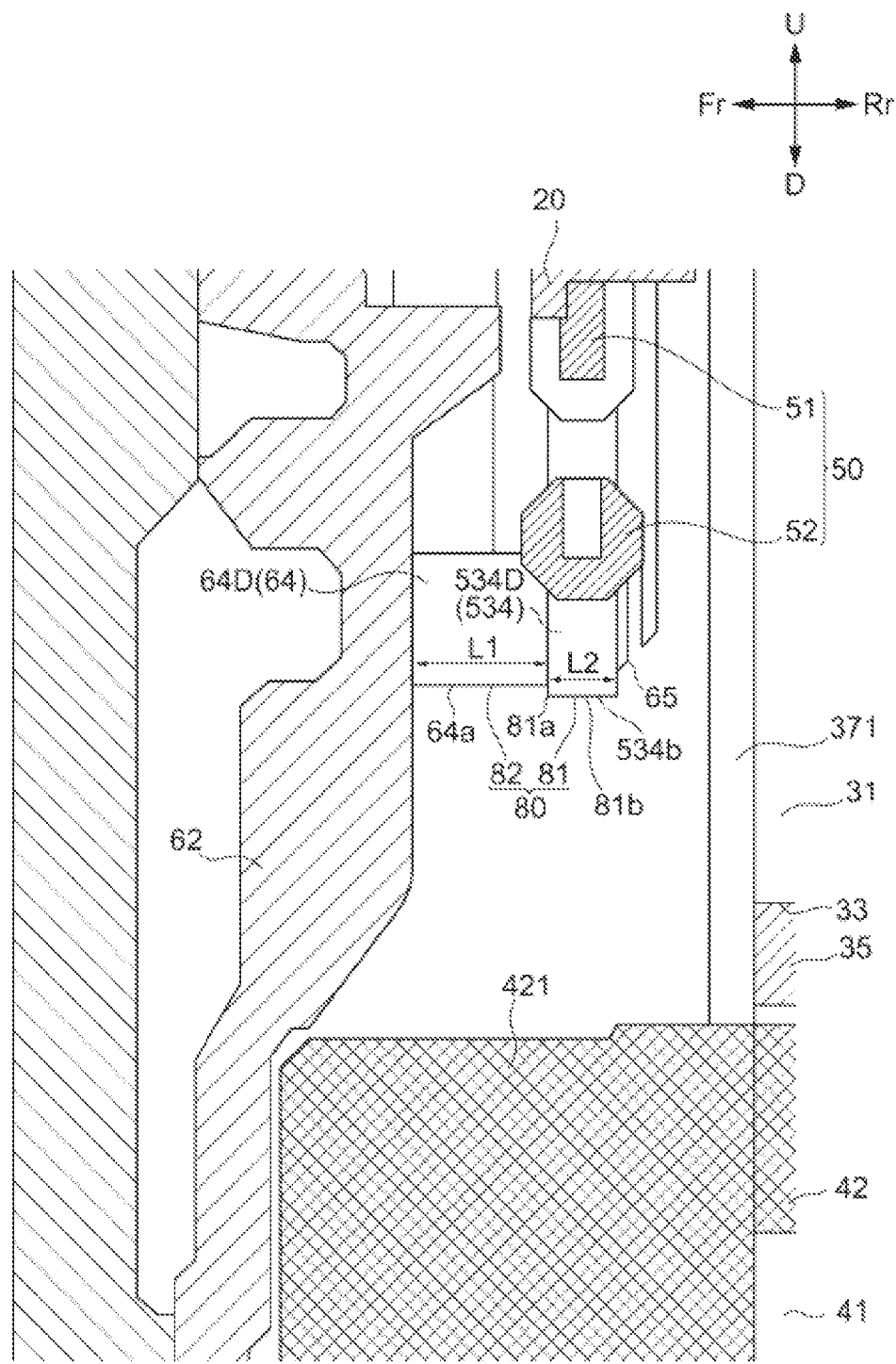
FIG. 3 is an enlarged view of the periphery of a protruding portion in FIG. 2.

As shown in FIG. 3, at a position below the rotation axis CL of the rotary electric machine 10 and overlapping with the rotary electric machine 10 in the left-right direction, the lower fastening boss portion 64D protruding rearward from the front cover 62 of the rotary electric machine housing 60 and the lower fastening portion 534D of the resolver stator 52 fixed to the lower fastening boss portion 64D form a protruding portion 80 extending in the axial direction from the front cover 62 toward the rotary electric machine 10.

Below the center of the protruding portion 80 in the upper-lower direction, a refrigerant flow lower surface 81 formed on a tip end side of the protruding portion 80 and extending in the axial direction, and a recessed surface 82 adjacent to a base side end portion 81a of the refrigerant flow lower surface 81 and extending in the axial direction at a position recessed upward than the refrigerant flow lower surface 81 are formed as viewed from the left-right direction.

In the present embodiment, the refrigerant flow lower surface 81 of the protruding portion 80 is formed by an outer peripheral surface 534b of the lower fastening portion 534D of the resolver stator 52. The recessed surface 82 of the protruding portion 80 is formed by an outer peripheral surface 64a of the lower fastening boss portion 64D protruding rearward from the front cover 62 of the rotary electric machine housing 60. More specifically, below the center of the protruding portion 80 in the upper-lower direction, the outer peripheral surface 534b of the lower fastening portion 534D of the resolver stator 52 is outside the outer peripheral surface 64a of the lower fastening boss portion 64D when viewed from the axial direction. Therefore, a lower end portion of the lower fastening portion 534D of the resolver stator 52 protrudes downward than the outer peripheral surface 64a of the lower fastening boss portion 64D.

In addition, the refrigerant flow lower surface 81 of the protruding portion 80, that is, the outer peripheral surface 534b of the lower fastening portion 534D of the resolver stator 52 is arranged such that an axial central portion 81b overlaps the front coil end portion 421 of the rotary electric machine 10 in the axial direction.

Therefore, a part of the refrigerant discharged from the refrigerant discharge hole 71 is scattered inside the rotary electric machine accommodating portion 600 of the rotary electric machine housing 60 due to the rotation of the rotation shaft 20, the rotor 30, and the resolver rotor 51, flows to the protruding portion 80 through the front cover 62 and the resolver stator 52, and flows downward from the protruding portion 80. In addition, below the center of the protruding portion 80 in the upper-lower direction, the refrigerant flow lower surface 81 and the recessed surface 82 extending in the axial direction at the position recessed upward than the refrigerant flow lower surface 81 are formed as viewed from the left-right direction, so that the refrigerant flowing downward from the protruding portion 80 mainly flows downward from the axial central portion 81b of the refrigerant flow lower surface 81. Further, the refrigerant flow lower surface 81 of the protruding portion 80 is arranged such that the axial central portion 81b overlaps the front coil end portion 421 of the rotary electric machine 10 in the axial direction, so that the refrigerant flowing downward from the axial central portion 81b of the refrigerant flow lower surface 81 is supplied to the front coil end portion 421 of the rotary electric machine 10. As a result, a larger amount of refrigerant can be supplied to a portion of the rotary electric machine 10 below the rotation axis CL, so that the cooling efficiency of the rotary electric machine 10 can be improved.

Further, an axial width L1 of the recessed surface 82 of the protruding portion 80, which is a length of the lower fastening boss portion 64D in the axial direction, is equal to or greater than an axial width L2 of the refrigerant flow lower surface 81 of the protruding portion 80, which is a thickness of the lower fastening portion 534D of the resolver stator 52 in the axial direction.

When the axial width of the recessed surface 82 of the protruding portion 80 is small, the refrigerant flowed to the protruding portion 80 through the front cover 62 does not flow from the recessed surface 82 to the refrigerant flow lower surface 81, but flows downward from the recessed surface 82; and the refrigerant flowed to the protruding portion 80 through the resolver stator 52 flows from the refrigerant flow lower surface 81 to the recessed surface 82, and flows downward from the recessed surface 82. Therefore, when the axial width of the recessed surface 82 of the protruding portion 80 is small, the refrigerant flowed to the protruding portion 80 through the front cover 62 or the resolver stator 52 flows downward from the recessed surface 82 instead of from the refrigerant flow lower surface 81. In the present embodiment, the axial width L1 of the recessed surface 82 is equal to or greater than the axial width L2 of the refrigerant flow lower surface 81 of the protruding portion 80, so that most of the refrigerant flowed to the protruding portion 80 through the front cover 62 flows from the recessed surface 82 to the refrigerant flow lower surface 81, and the refrigerant flowed to the protruding portion 80 through the resolver stator 52 is prevented from flowing from the refrigerant flow lower surface 81 to the recessed surface 82. As a result, the refrigerant flowed to the protruding portion 80 can be prevented from flowing to the recessed surface 82, and a large amount of refrigerant can flow downward from the refrigerant flow lower surface 81.

As described above, the lower fastening boss portion 64D protruding rearward from the front cover 62 of the rotary electric machine housing 60 and the lower fastening portion 534D of the resolver stator 52 fixed to the lower fastening boss portion 64D form the protruding portion 80, and the outer peripheral surface 534b of the lower fastening portion 534D of the resolver stator 52 forms the refrigerant flow lower surface 81 of the protruding portion 80, so that a larger amount of refrigerant can be supplied to a portion of the rotary electric machine 10 below the rotation axis CL without increasing the number of parts.

Although the embodiment of the present invention has been described above, the present invention is not limited thereto and modifications, improvements, or the like can be made as appropriate.

For example, in the present embodiment, the protruding portion 80 is formed by the lower fastening boss portion 64D protruding rearward from the front cover 62 of the rotary electric machine housing 60 and the lower fastening portion 534D of the resolver stator 52 fixed to the lower fastening boss portion 64D. However, the protruding portion 80 having the refrigerant flow lower surface 81 and the recessed surface 82 may be provided separately from the lower fastening boss portion 64D and the lower fastening portion 534D.

Further, for example, in the present embodiment, the recessed surface 82 of the protruding portion 80 is formed by the outer peripheral surface 64a of the lower fastening boss portion 64D extending in the axial direction above the lower fastening portion 534D of the resolver stator 52. However, a stepped surface extending in the axial direction above the outer peripheral surface 64a may be provided on a tip end side of the outer peripheral surface 64a of the lower fastening boss portion 64D, and the stepped surface is used as the recessed surface 82 of the protruding portion 80. At this time, an axial width of the stepped surface is preferably equal to or larger than an axial width L2 of the refrigerant flow lower surface 81.

Further, for example, in the present embodiment, the rotary electric machine housing 60 has the main housing 61 and the front cover 62, in which the main housing 61 covers the outer peripheral surface and the rear surface of the rotary electric machine 10, forms the outer peripheral surface and the rear surface of the rotary electric machine accommodating portion 600, and has the open front surface; and the front cover 62 faces the front surface of the rotary electric machine 10, covers the front surface of the rotary electric machine 10, forms the front surface of the rotary electric machine accommodating portion 600, and closes the open front surface of the main housing 61. However, the rotary electric machine housing 60 may not have the main housing 61 and the front cover 62, and may have those constitute any one of the front surface, the rear surface, and the outer peripheral surface of the rotary electric machine accommodating portion 600. For example, the rotary electric machine housing 60 may have a main housing that forms the front surface and the outer peripheral surface of the rotary electric machine accommodating portion 600, and a rear cover that forms the rear surface of the rotary electric machine accommodating portion 600.

Further, at least the following matters are described in the present specification. Although the corresponding constituent elements or the like in the above embodiment are shown in parentheses, the present invention is not limited thereto.

(1) A rotary electric machine unit (rotary electric machine unit 1), including:

a rotary electric machine (rotary electric machine 10) having a rotation axis (rotation axis CL) extending in a horizontal direction;

a rotary electric machine housing (rotary electric machine housing 60) having a rotary electric machine accommodating portion (rotary electric machine accommodating portion 600) in which the rotary electric machine is accommodated; and a refrigerant supply portion (refrigerant discharge hole 71) accommodated in the rotary electric machine accommodating portion and through which a refrigerant is supplied to the rotary electric machine, in which the refrigerant supply portion is arranged at a position above the rotation axis of the rotary electric machine and overlapping the rotary electric machine in a left-right direction which is orthogonal to both an upper-lower direction and an axial direction, the refrigerant is discharged from the refrigerant supply portion so that the refrigerant is supplied to the rotary electric machine, the rotary electric machine housing has a one end side cover portion (front cover 62) facing one end surface (front surface) in the axial direction of the rotary electric machine, a protruding portion (protruding portion 80) extending in the axial direction from the one end side cover portion toward the rotary electric machine is formed at a position below the rotation axis of the rotary electric machine and overlapping with the rotary electric machine in the left-right direction, below a center of the protruding portion in the upper-lower direction, a refrigerant flow lower surface (refrigerant flow lower surface 81) formed on a tip end side of the protruding portion and extending in the axial direction, and a recessed surface (recessed surface 82) adjacent to a base side end portion (base side end portion 81a) of the refrigerant flow lower surface and extending in the axial direction at a position recessed upward than the refrigerant flow lower surface are formed as viewed from the left-right direction, and the refrigerant flow lower surface of the protruding portion is arranged such that an axial central portion (axial central portion 81b) overlaps the rotary electric machine in the axial direction.

According to (1), in the rotary electric machine housing, the protruding portion extending in the axial direction from the one end side cover portion toward the rotary electric machine is formed at a position below the rotation axis of the rotary electric machine and overlapping with the rotary electric machine in the left-right direction, so that a part of the refrigerant scattered in the rotary electric machine accommodating portion of the rotary electric machine housing flows toward the protruding portion and flows downward from the protruding portion. In addition, below the center of the protruding portion in the upper-lower direction, the refrigerant flow lower surface formed on the tip end side of the protruding portion and extending in the axial direction, and the recessed surface adjacent to the base side end portion of the refrigerant flow lower surface and extending in the axial direction at a position recessed upward than the refrigerant flow lower surface are formed as viewed from the left-right direction, so that the refrigerant flowing downward from the protruding portion mainly flows downward from the axial central portion of the refrigerant flow lower surface. Further, the refrigerant flow lower surface of the protruding portion is arranged such that the axial central portion overlaps the rotary electric machine in the axial direction, so that the refrigerant flowing downward from the axial central portion of the refrigerant flow lower surface is supplied to the rotary electric machine. As a result, a larger amount of refrigerant can be supplied to a portion of the rotary electric machine below the rotation axis, so that the cooling efficiency of the rotary electric machine can be improved.

(2) In the rotary electric machine unit according to (1), an axial width (axial width L1) of the recessed surface is equal to or higher than an axial width (axial width L2) of the refrigerant flow lower surface.

According to (2), the axial width of the recessed surface is equal to or larger than the axial width of the refrigerant flow lower surface, so that the refrigerant flowed to the protruding portion can be prevented from flowing to the recessed surface, and a larger amount of refrigerant can flow downward from the refrigerant flow lower surface.

(3) In the rotary electric machine unit according to (1) or (2), a rotation speed detection device (resolver 50) configured to detect a rotation speed of the rotary electric machine is attached to the rotary electric machine housing, and the refrigerant flow lower surface of the protruding portion is a part of the rotation speed detection device (lower fastening portion 534D).

According to (3), the refrigerant flow lower surface of the protruding portion is a part of the rotation speed detection device, so that a larger amount of refrigerant can be supplied to a portion of the rotary electric machine below the rotation axis without increasing the number of parts.

The invention claimed is:

1. A rotary electric machine unit, comprising:
    a rotary electric machine having a rotation axis extending in a horizontal direction;
    a rotary electric machine housing having a rotary electric machine accommodating portion in which the rotary electric machine is accommodated; and
    a refrigerant supply portion accommodated in the rotary electric machine accommodating portion, a refrigerant being supplied to the rotary electric machine through the refrigerant supply portion, wherein:
    the refrigerant supply portion is arranged at a position above the rotation axis of the rotary electric machine and overlapping the rotary electric machine in a left-right direction that is orthogonal to both an upper-lower direction and an axial direction;
    the refrigerant is discharged from the refrigerant supply portion so that the refrigerant is supplied to the rotary electric machine;
    the rotary electric machine housing has a one end side cover portion facing one end surface in the axial direction of the rotary electric machine;
    a protruding portion extending in the axial direction from the one end side cover portion toward the rotary electric machine is formed at a position below the rotation axis of the rotary electric machine and overlapping with the rotary electric machine in the left-right direction;
    below a center of the protruding portion in the upper-lower direction, a refrigerant flow lower surface and a recessed surface are formed as viewed from the left-right direction, the refrigerant flow lower surface being formed on a tip end side of the protruding portion and extending in the axial direction, and the recessed surface being formed adjacent to a base side end portion of the refrigerant flow lower surface and extending in the axial direction at a position recessed upward from the refrigerant flow lower surface; and
    the refrigerant flow lower surface of the protruding portion is arranged such that an axial central portion of the refrigerant flow lower surface overlaps the rotary electric machine in the axial direction.

2. The rotary electric machine unit according to claim 1, wherein
    an axial width of the recessed surface is equal to or higher than an axial width of the refrigerant flow lower surface.

3. The rotary electric machine unit according to claim 1, wherein:
    a rotation speed detection device is attached to the rotary electric machine housing;
    the refrigerant flow lower surface of the protruding portion is a part of the rotation speed detection device; and
    a rotation speed of the rotary electric machine is detected by utilizing the rotation speed detection device.

* * * * *